United States Patent [19]
Dunegan

[11] 3,871,362
[45] Mar. 18, 1975

[54] BODY TEMPERATURE AND HEAT RATE MEASUREMENT SYSTEM

[76] Inventor: Gerald W. Dunegan, 611 Montclair Blvd., Sugurland, Tex. 77478

[22] Filed: Nov. 27, 1973

[21] Appl. No.: 419,263

[52] U.S. Cl. ......... 128/2.06F, 128/2 H, 128/2.05 P, 128/2.05 T, 73/344, 73/362 AR
[51] Int. Cl. ..................................................... A61b 5/00
[58] Field of Search ...... 128/2.06 F, 2.05 T, 2.05 P, 128/2.05 R, 2.06 R, 2.06 A, 2.1 A, 2 L, 2 H; 73/344, 362 AR

[56] References Cited
UNITED STATES PATENTS

| | | | |
|---|---|---|---|
| 2,756,741 | 7/1956 | Campanella | 128/2.05 T |
| 3,556,084 | 1/1971 | Budde | 128/2.05 P |
| 3,586,835 | 6/1971 | Foeh, Jr. | 128/2.06 F |
| 3,593,704 | 7/1971 | Schwab | 128/2.05 P |
| 3,602,222 | 8/1971 | Herndon | 128/2.06 F |
| 3,633,569 | 1/1972 | Brayshaw | 128/2.06 F |
| 3,646,931 | 3/1972 | Phelps | 128/2.05 P |
| 3,704,706 | 12/1972 | Herczfeld et al. | 128/2.05 P |
| 3,717,140 | 2/1973 | Greenwood | 128/2.06 F |
| 3,766,908 | 10/1973 | Haynes | 128/2 H |

OTHER PUBLICATIONS
Caldwell et al, "Beat-By-Beat Cardiotach," Med. & Biol. Eng'r., Vol. 8, No. 2, pp. 181–185, 1970.

*Primary Examiner*—Richard A. Gaudet
*Assistant Examiner*—Lee S. Cohen

[57] ABSTRACT

A heart rate and body temperature measurement system where the temperature is measured by a thermistor placed in intimate contact with the patient which varies in resistance value, the variation being converted to a voltage which is applied to a voltage controlled oscillator forming a pulse train input to a storage register. The register is gated in timed intervals into a digital display utilizing a mode switch and reset switch. The mode switch selects temperature or pulse rate. The pulse rate is determined by transluminating a finger of the patient with a light source such as a bulb and observing coloration changes with a light sensitive device, the signal being applied to an amplifier circuit driving a schmitt trigger, the output being stretched by a monostable multivibrator and the pulses being stored in an integrating amplifier which provides a DC level. The DC level is also applied to the mode switch which is input to the same VCO. The mode switch selects pre-set inputs for the register which again is gated by a timed signal into a digital display. The apparatus described is a portable indicating device.

4 Claims, 1 Drawing Figure

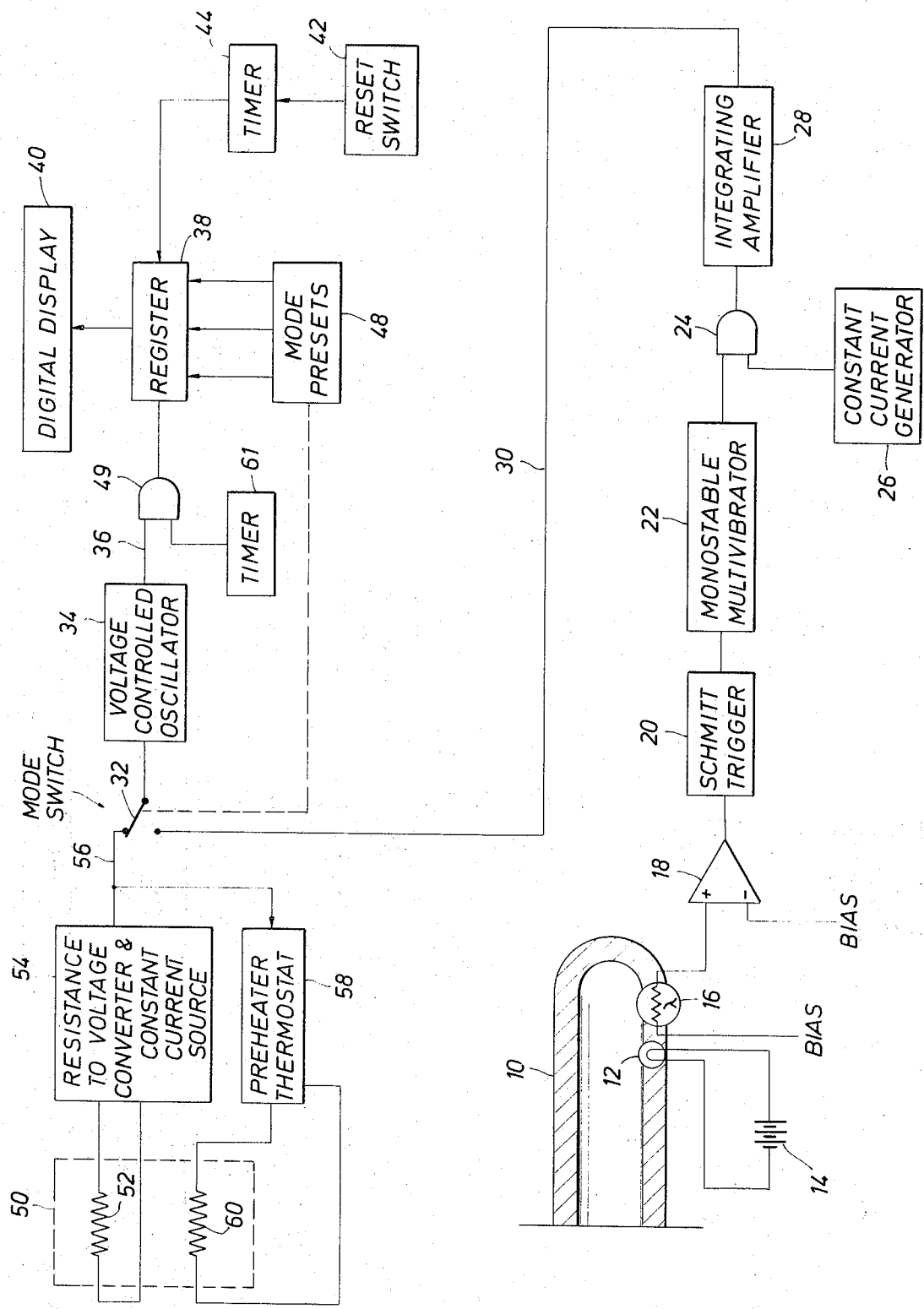

BODY TEMPERATURE AND HEAT RATE MEASUREMENT SYSTEM

PRIOR ART

U.S. Pat. No. 3,452,744, 3,646,606, 3,658,060.

BACKGROUND OF THE INVENTION

In medical care facilities, significant bodily functions are observed periodically by the medical personnel by monitoring the heart rate and body temperature. The personnel during operation of a nursing home, hospital or other facility may indeed take hundreds of measurements. The present technique of obtaining heart rate requires medical personnel to locate the pulse, observe a sweep second hand on a timepiece, and mentally count for a stated interval whereupon simple arithmetic converts the pulses counted into a rate which is normally stated in pulses per minute. The patents mentioned above disclose some form of apparatus which provides this measure in a more automated fashion. However, it is the goal and purpose of the apparatus of the present invention to provide a portable monitoring device which requires a minimum of attention and effort on the part of the personnel. In particular, the medical personnel does not have to grope or feel for a pulse. Rather, the patient inserts a finger into a receptacle and the apparatus transluminates the finger enabling the apparatus to sense changes in light intensity with each beat of the heart. The output is supplied automatically upon triggering a timer. Reading errors are avoided by providing the pulse rate on a digital display.

The present invention enables the user when attending to a patient to additionally test the temperature of that patient. A temperature probe is typically placed in the mouth of the patient prior to testing the pulse rate. The temperature probe is preferably permitted to stabilize for a few seconds while the pulse rate measurement described above is taken. Both measurements preferably have a finite time span to enable the observer to obtain a settled measurement. Preferably, about one/half minute is allotted to the pulse rate. The pulse rate measurement is indicated on the digital display. A mode switch is operated and the temperature is measured for a designated interval. Thereafter, the same digital display indicates the temperature. This enables the medical technician to obtain both measurements at one call at a particular station, thereafter moving on, carrying the portable equipment of the present invention to the next patient or subject of testing. Inasmuch as the apparatus is portable, quick measurements are obtained as the medical technician moves from patient to patient.

SUMMARY OF THE INVENTION

The present invention is summarized as a portable, self-contained apparatus which measures and indicates the temperature and heart rate of a patient. The pulse rate is obtained by transluminiating a finger of the patient which is inserted into a small receptacle. A light positioned near the finger casts light on the finger, and a photo sensitive device observes changes in light intensity with each heart beat. The changes in intensity are sensed by a photo sensitive device which is connected as an input to an amplifier. The amplifier provides an adequate level for driving a schmitt trigger which provides output pulses coincident with the heart beat. The pulses are stretched in a monostable multivibrator which is input to a gate. The gate has a second input from a constant current generator. The gate is an AND gate connected to an integrating amplifier which converts the pulses into a control voltage. The control voltage is supplied to a voltage controlled oscillator which is then input to a register. The register is gated on and off by a timer. Pre-sets are supplied to the register to provide a base measure taking care of the problem of offset from zero to obtain a number which is meaningful and scaled to avoid the problem of data conversion. In addition to the foregoing, the apparatus uses a linear thermistor which is incapsulated in a suitable removable throwaway mouthpiece to obtain the temperature of the patient. The thermistor biased by a conseant current source is input to a resistance to voltage converter which provides a DC level output. It is supplied to a mode switch which selects the signal from the integrating amplifier mentioned above. The mode switch again supplies the signal to the VCO. The mode switch also operates a separate set of presets for the register which provide the necessary scale and offset inputs to the register to enable the digital display to provide a meaningful number to the digital display which number is customarily calibrated in degrees F.

BRIEF DESCRIPTION OF THE DRAWINGS

The single drawing is a schematic block diagram of the system of the present invention.

DESCRIPTION OF THE PREFERRED EMBODIMENT

Attention is directed to the single drawing which is a schematic block diagram. The apparatus for obtaining the heart rate will be described first. The numeral 10 identifies a receptacle which is sized to receive the finger of a patient. The entire finger is not required. The receptacle 10 is preferably deep enough to receive a portion of the patient's finger. A light source such as lamp 12 powered by a suitable voltage source 14 is positioned to illuminate a portion of the patient's finger. A light sensitive device such as a phototransistor, photocell or photodiode 16 connected with a suitable bias source is positioned where the light from the source 12 illuminates the finger and is reflected to the photodiode 16. The photodiode is responsive to changes in light reflection from the patient's finger on each heart beat. As the blood surges with the heart beat, the surge of fresh blood at the finger changes the reflection intensity sufficiently to create a change in resistance at the photodiode. The apparatus is useful with patients of any age and all skin colors. The output of the diode 16 is supplied to a differential amplifier 18. The surge of blood in the finger of the patient thus is converted into a voltage pulse from the amplifier 18. The voltage pulse is supplied to a schmitt trigger 20.

The schmitt trigger 20 forms an output pulse when the input exceeds a predetermined level. The level for triggering of the schmitt trigger 20 is made adjustable. In the event the heart beat is rather faint or the signal from the amplifier is small for any reason, the level at which the schmitt trigger 20 fires is preferably made adjustable. This enables the user to adjust the apparatus for different patients.

The schmitt trigger provides a to a monostable multivibrator. The monostable multivibrator 22 forms an output pulse of a fixed duration or time period. It is supplied to an AND gate 24. The AND gate 24 has an input from a constant current generator 26. Thus, a pulse of uniform current flow and of uniform duration is provided at the output of the gate 24 for each heart beat. These pulses are supplied to an integrating amplifier 28 which forms a DC voltage level on a conductor 30. The signal is a proportional analog of the heart rate. In other words, an increase in heart rate provides an increase in DC level.

The conductor 30 is supplied to a mode switch 32. The mode switch provides an input for a voltage controlled oscillator 34. If forms a procession of pulses input on a conductor 36 to a multibit register 38. The register 38 receives and stores the number of pulses input thereto and provides an output for illuminating a digital display 40. The pulses stored in the register 38 thus provide a numeric indication on the digital display 40.

A reset switch 42 triggers a timer 44 into action. The timer 44 preferably has a fixed time frame. In other words, the timer 44 provides a signal which inhibits output of the register 38 to hold the last totalled digital value so it can be displayed. The number stored in the register is transferred to the digital display 40.

The register 38 has multibit storage capacity. The register 38 typically starts from some pre-set number such as zero and counts upwardly depending on scal factors applied to the integrating amplifier 28 and VCO 34. Scale factors can be adjusted so that the number of pulses from the VCO 34 may be varied. Inasmuch as the apparatus incorporates a scale factor, the number displayed by the apparatus needs means for calibration. The pre-set circuit 48 resets the register to some selected number such as zero to allow the register to count therebeyond for an interval controlled by a timer 61 and a gate 49 to provide a number on the digital display which is meaningful and scaled to real time events.

By way of example, presume that the heart rate of the patient is 72. Presume that the VCO provides pulses at 1,440 pulses per second. Presume that the gate 49 is open for 500 ms commanded by the timer 61. The number of pulses passed by the gate 49 is 720. The register may have an extra decade but by placing the decimal to the left of the zero the actual pulse rate would be displayed. The timer 44 allows the register to count for a selected interval to stablize the reading and then inhibits the register to display the last stored data. The data is displayed until the timer 44 is reset by ths switch 42. The pre-sets have supplied the pre-set number and scale factor accommodating the conversion from the pulses to heart rate.

The schematic further includes a mouthpiece 50 which encapsulates and encloses temporarily a linear thermistor 52. The thermistor 52 senses the body temperature of the patient. The thermistor 52 is connected to a resistance to voltage converter 54. A constant current generator supplies current to the thermistor. It forms a signal on a conductor 56 which is a DC analog of resistance and hence proportional to body temperature. The signal on the conductor 56 is input to a preheater thermostat 58 which provides a driving signal for a heater 60 which is incorporated in the mouthpiece 50. This brings the thermistor 52 up to some predetermined temperature level. The pre-determined level can approximate the lowest level which can reasonably be obtained such as about 94° F. Body temperature measurements below this are rare indeed. This avoids the necessity of the patient's body warming the temperature sensor 52 over an unduly wide temperature range. Preferably, the heater 58 provides a preheater temperature level which is below that actually achieved by the temperature sensor 52.

The output is supplied on the conductor 56 to the mode switch 32 previously named. The mode switch is input to the VCO 34 which then converts the DC analog into a procession of pulses for the register 38. Again, the mode switch 32 is connected to the mode pre-sets 48 and provide a base or fixed number to the register 38 which is stored therein on temperature measurements. This enables the same register to be used for both indications. As will be recognized, three digit accuracy is normally required in indicating body temperature. Moreover, the numbers are fairly substantial and differ from the numbers indicative of heart rate. As a consequence, the pre-set 48 supplies a bias number to the register 38. Again, the pre-set is stored in the register as a constant and the pulses from the VCO 34 run the register total higher to provide a number which is scaled to the body temperature of the patient typically in degrees Fahrenheit. If desired, the apparatus can indicate in degrees centigrade.

The mode switch 32 thus selects which of the two functions is to be indicated and also switches between two pre-sets input to the register 38. Preferably the timer 44 runs for the same interval for both measurements. There is no benefit in operating the timer 44 for different intervals for the two measurements made by the present invention.

The present invention is particularly adapted to be fabricated of integrated circuits and packaged in a small case with a digital display to enable the user to carry it as portable equipment from patient to patient. The heart rate can be measured without any change of apparatus. However, the shield 50 must be disposed of after each patient has been tested. To this end, a relatively inexpensive and thin wall elongate container formed of a material which transfers heat readily is used. The shield 50 must be replaced after each use.

The foregoing has been directed to the preferred embodiment of the present invention. Any changes and alterations therein can be incorporated without departing from the scope hereof:

I claim:

1. A physiological indicating system comprising:
    transducer means for engaging a finger of a patient to form optically created pulse signals and
    wherein said transducer means includes
      a lamp means for transilluminating a finger and
      light responsive means for observing a change in the finger on a heart beat;
    circuit means for converting the pulse signals into a voltage analogous to the pulse rate, said means comprising
      an amplifier connected to said transducer means;
      level responsive circuit means connected to said amplifier for forming a pulse on a pulse of the finger so observed;
      means for making the pulse so formed uniform in length;
      means for summing said pulses so said circuit means can form a voltage analogous to the pulse rate;
    a voltage dependent oscillator connected to said circuit means for forming output pulses at least partly proportional to the voltage level;

register means for storing the number of pulses input thereto from said oscillator;

pre-set circuit means connected to said register for providing a pre-set number therein serving as a scale factor so that the number of pulses stored in said register is scaled to the measure of interest;

timing means which gates said register on for a specified interval; and, digital display means connected to said register means for providing a digital indication.

2. The apparatus of claim 1, including a thermistor means adapted to be heated by a patient to obtain an indication of the temperature of the patient;

second circuit means connected to said thermistor for converting the temperature sensed thereby to a voltage level; and, means for selectively providing the signal from said second circuit means to said voltage dependent oscillator.

3. The apparatus of claim 2 including pre-heater means for said thermistor means which raises it to a pre-selected temperature level.

4. The apparatus of claim 1 including housing means for receiving the finger of the patient and wherein said lamp means is positioned by said housing means for illuminating the finger of the patient.

* * * * *